(12) United States Patent
Berkowitz et al.

(10) Patent No.: US 10,784,812 B2
(45) Date of Patent: Sep. 22, 2020

(54) POWER GRID PHOTO-VOLTAIC INTEGRATION USING DISTRIBUTED ENERGY STORAGE AND MANAGEMENT

(71) Applicant: S&C Electric Company, Chicago, IL (US)

(72) Inventors: Donald Berkowitz, Redmond, WA (US); Thomas Walker, Westerville, OH (US)

(73) Assignee: S&C Electric Company, Chicago, IL (US)

(*) Notice: Subject to any disclaimer, the term of this patent is extended or adjusted under 35 U.S.C. 154(b) by 64 days.

(21) Appl. No.: 14/408,215

(22) PCT Filed: Jun. 12, 2013

(86) PCT No.: PCT/US2013/045371
§ 371 (c)(1),
(2) Date: Dec. 15, 2014

(87) PCT Pub. No.: WO2013/188517
PCT Pub. Date: Dec. 19, 2013

(65) Prior Publication Data
US 2015/0188482 A1     Jul. 2, 2015

Related U.S. Application Data

(60) Provisional application No. 61/659,227, filed on Jun. 13, 2012.

(51) Int. Cl.
*H02S 10/20* (2014.01)
*H02J 3/38* (2006.01)
(Continued)

(52) U.S. Cl.
CPC .............. *H02S 10/20* (2014.12); *H02J 3/32* (2013.01); *H02J 3/383* (2013.01); *H02S 40/38* (2014.12);
(Continued)

(58) Field of Classification Search
CPC .. H02S 10/20; H02S 40/38; H02J 3/32; H02J 3/383
(Continued)

(56) References Cited

U.S. PATENT DOCUMENTS

2002/0041126 A1*   4/2002   Provanzana .............. H02J 3/28
                                                                                                               307/48
2008/0167756 A1   7/2008   Golden et al.
(Continued)

FOREIGN PATENT DOCUMENTS

EP            1022838 A2     7/2000
WO       2004/027959 A1     4/2004
WO    WO 2004027959 A1 *     4/2004     ............... H02J 3/24

OTHER PUBLICATIONS

The Canadian Office Action and Examination Search Report dated Mar. 29, 2019 for Canadian Patent Application No. 2,876,066. (5 pages).

(Continued)

*Primary Examiner* — Suresh Memula

(57) ABSTRACT

Distributed energy storage within the distribution network of an electric power network at least partially supplied by time varying and unpredictable generation sources provides smoothing of energy flow within the distribution network. The distributed energy storage may include a plurality of distributed energy storage units operating under the control of a single controller or regional controllers. The distributed energy storage units may operate as groups of units or as separate units.

13 Claims, 5 Drawing Sheets

(51) Int. Cl.
  *H02S 40/38* (2014.01)
  *H02J 3/32* (2006.01)
  *H01M 10/46* (2006.01)

(52) U.S. Cl.
  CPC .......... *H01M 10/465* (2013.01); *Y02E 10/563* (2013.01); *Y02E 10/566* (2013.01); *Y02E 70/30* (2013.01)

(58) Field of Classification Search
  USPC ........................................................ 320/101
  See application file for complete search history.

(56) References Cited

U.S. PATENT DOCUMENTS

| | | |
|---|---|---|
| 2008/0212343 A1 | 9/2008 | Lasseter et al. |
| 2008/0224541 A1 | 9/2008 | Fukuhara |
| 2010/0198421 A1* | 8/2010 | Fahimi ............... H02J 3/32 700/291 |
| 2011/0193516 A1 | 8/2011 | Oohara et al. |
| 2011/0282514 A1* | 11/2011 | Ropp ............... H02J 3/383 700/297 |

OTHER PUBLICATIONS

The European Examination Report dated Sep. 5, 20108 for European Application No. 13 805 117.2. (6 pages).
The European Search Report dated Feb. 25, 2016 for European Application No. 13 805 117.2. (11 pages).
The Written Opinion and the International Search Report dated Dec. 2, 2013 for International Application No. PCT/US2013/045371. (11 pages).

* cited by examiner

POWER GRID PHOTO-VOLTAIC INTEGRATION USING DISTRIBUTED ENERGY STORAGE AND MANAGEMENT

CROSS-REFERENCE TO RELATED APPLICATION

This patent is related to commonly-assigned International Application Serial No. PCT/US2012/023422 filed Feb. 1, 2012 the disclosure of which is hereby expressly incorporated herein for all purposes.

This patent claims priority benefit of U.S. Provisional Application Ser. No. 61/659,227 filed Jun. 13, 2012, the disclosure of which is hereby expressly incorporated herein for all purposes.

TECHNICAL FIELD

This patent provides apparatus and methods to control and coordinate a multiplicity of electric distribution grid-connected, energy storage units deployed over a geographically dispersed area and in particular in combination with photo-voltaic generation.

BACKGROUND

Widely deployed (high penetration) photo-voltaic (PV) solar arrays can make a positive contribution to the supply of energy but have an adverse effect on system capacity due to the timing of solar power availability as compared to the time profile of typical loads. The demand for electricity peaks after sunlight has diminished. It is therefore desirable to store PV energy for release later to offset peak demand.

Secondly, a high penetration of PV arrays can cause severe power quality disturbances on the distribution system due to the cumulative effects of all of these arrays being powered by a single source (sunlight) that is subject to atmospheric variation (clouds, fog, haze, etc.). Distribution system voltage and power control equipment cannot respond fast-enough to these variations to prevent widespread customer power quality issues such as flicker.

DETAILED DESCRIPTION

In accordance with embodiments described herein, a technical solution to address system capacity and system disturbance concerns caused by wide deployment of PV generation capacity is to provide associated with PV sources local energy storage. The local energy storage may be adapted to buffer the variation in solar output. The local energy storage may be adapted to each PV installation, groups of PV installations or PV installations may be coordinated with existing distributed energy storage systems. This local storage, in the form of distributed units of storage or other potential configurations, could then be coordinated by a distribution system operator to allow the stored energy to be used at the most advantageous time of the day or night.

Thus, embodiments of systems and controls described herein facilitate and provide renewable energy source integration with existing grid and distribution infra-structure. That is, to meet the desire to most-cost-effectively utilize the solar power given its high capital cost, low operating cost and unpredictable behavior versus the complex economics of the underlying electric distribution system. For example, solar power produced in the middle of the day in a residential community where loads are low, might best be stored for use in the early evening when loads in the residential community are high. Such "load shifting" is a high-value application, allowing the energy to be used to reduce the need for costly, additional peak power generation and other capacity improvements.

A system as described herein may be implemented as an extension of the Distributed Energy Management (DEM) System disclosed and described in the aforementioned International Application Serial No. PCT/US2012/023422. The system may therefore utilize local energy storage units or distributed energy storage (DES) units with power smoothing and voltage control algorithms combined with the DEM to provide a system of local, fast acting power conditioning with coordinated control to address system-wide, PV-related energy management and distribution system capacity management requirements. Advantageously, the resulting system eliminates the need for any modifications to stand-alone PV systems, regulatory requirements or incursion into the customer's premises in any way.

Figure 1A:
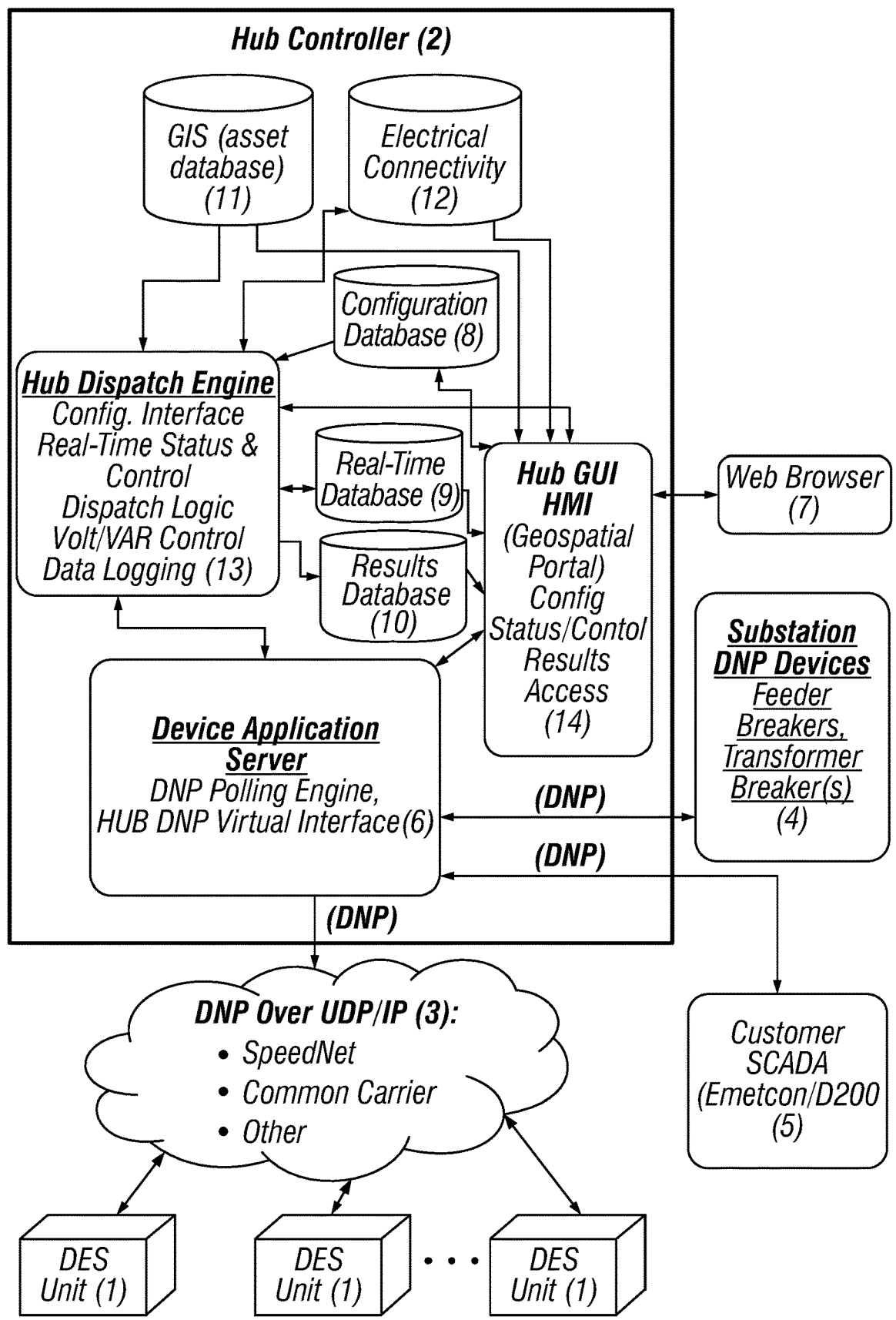
FIG. 1a illustrates an embodiment of a distributed energy storage (DES) system.

A system implementation as described herein advantageously avoids commercial and technical impediments to providing smoothing integrated with each solar installation such as the fact that the distribution system requirements for smoothing are not generally addressed in commercial or residential, grid-connected solar systems. Such provisions would require extensive product features, regulatory structure and utility communications and control systems that are presently nonexistent. Furthermore, the need for the smoothing only arises as the amount of solar generation becomes a significant proportion of the overall feeder load. Solar penetration in the 5 to 20% range would be required, while today, and perhaps for many years to come, most feeders have much lower penetration levels. A primary use and the benefit of DEM-based systems as described herein is that they provide a solution for utilities to address the issues of timing and variation of PV generator output. The herein described DEM-based systems can be introduced retroactively as the level of PV penetration increases or in anticipation of PV penetration. The units can be incrementally deployed, precluding the need for a high, initial investment While fully described in the aforementioned International Application, to assist the reader a brief overview of the described DEM/DES system is repeated here in reference to FIGS. 1a and 1b. Connectors depicted in the drawings indicate information exchange between components. The DES units 1 are assembled or prepackaged components or boxes including energy storage modules (batteries in the present system). The system could use virtually any form of energy storage, including kinetic, capacitive, chemical, etc., as long as it is locally convertible by the unit to electrical energy on demand. The DES units 1 also include a four-quadrant inverter and digital computer-based control with the ability to communicate to the outside world. The present units utilize the open standard DNP3 communication protocol to communicate to the HUB Controller ("HUB") 2 although modern computer technology provides a wide variety of application protocols that could be used. Since the DES units are dispersed over a wide geographic area, a radio communication system 3 preferentially facilitates the information exchange with the HUB 2. S&C Electric Company's SpeedNet™ radio system can be used for this purpose, as can a wide variety of other communication products using radio or any other suitable media.

The HUB 2 executes the energy dispatch and coordination functions that are the subject of this patent. In an embodiment, the HUB is provided as a pre-packaged, self-contained, rack mountable, PC-based server appliance, with internal software components organized using a service-oriented architecture (SOA). The software may be built around the Microsoft Corporation's Windows™ Server 2008 operating system, although any other suitable technology, multi-tasking PC operating system could be used. The HUB 2 is primarily self-contained in that it is able to operate and dispatch energy-related operating commands and data without external components other than the DES units (and the intervening wide area communication system), plus a local communication interface 4 to the substation's feeder and transformer breakers which have their own, internal capability to sense current, voltage and other power-related data at the respective breaker. These breakers are commonly available from a wide variety of sources and are typically outfitted with prepackaged breaker controls. The breaker controls include instrumentation and metering functions that allow feeder power/metering data (voltage, current and other derived power properties) to be accessed. The data is then made available to other substation applications such as the HUB, using DNP3. DNP3 can run over local communication media such as Ethernet or RS232 serial lines, both used widely in the substation environment. The data is provided to the HUB as pre-conditioned, averages over a few seconds of time to reduce the inaccuracy due to brief fluctuations. An example breaker control is the Schweitzer Engineering Laboratories (SEL) 351S. Although the HUB has been implemented with the above components, there are many possible ways to implement the system architecture, the goal being to bring information from the DES units, from other instrumentation such as substation feeder breakers, transformers, and from a system configuration database into an intelligent device that can allocate energy flows in to and out of the DES units based on diverse potential needs and requirements.

Another interface to the outside world is an optional interface to the customer's SCADA system 5 to allow the distribution operators to monitor and manage the HUB 2 in a limited sense. The interface also provides the capability for the utility's distribution operators to select the Regional Demand Limit, which is one of the HUB's system settings. This value is accessible over DNP3 as an analog output to an external application. The utility could therefore provide the means for an external automation system such as the utility's Energy Management System or Distribution Management System to automatically set the value using DNP3 and the same communication interface used by the SCADA system 5.

Figure 1B:
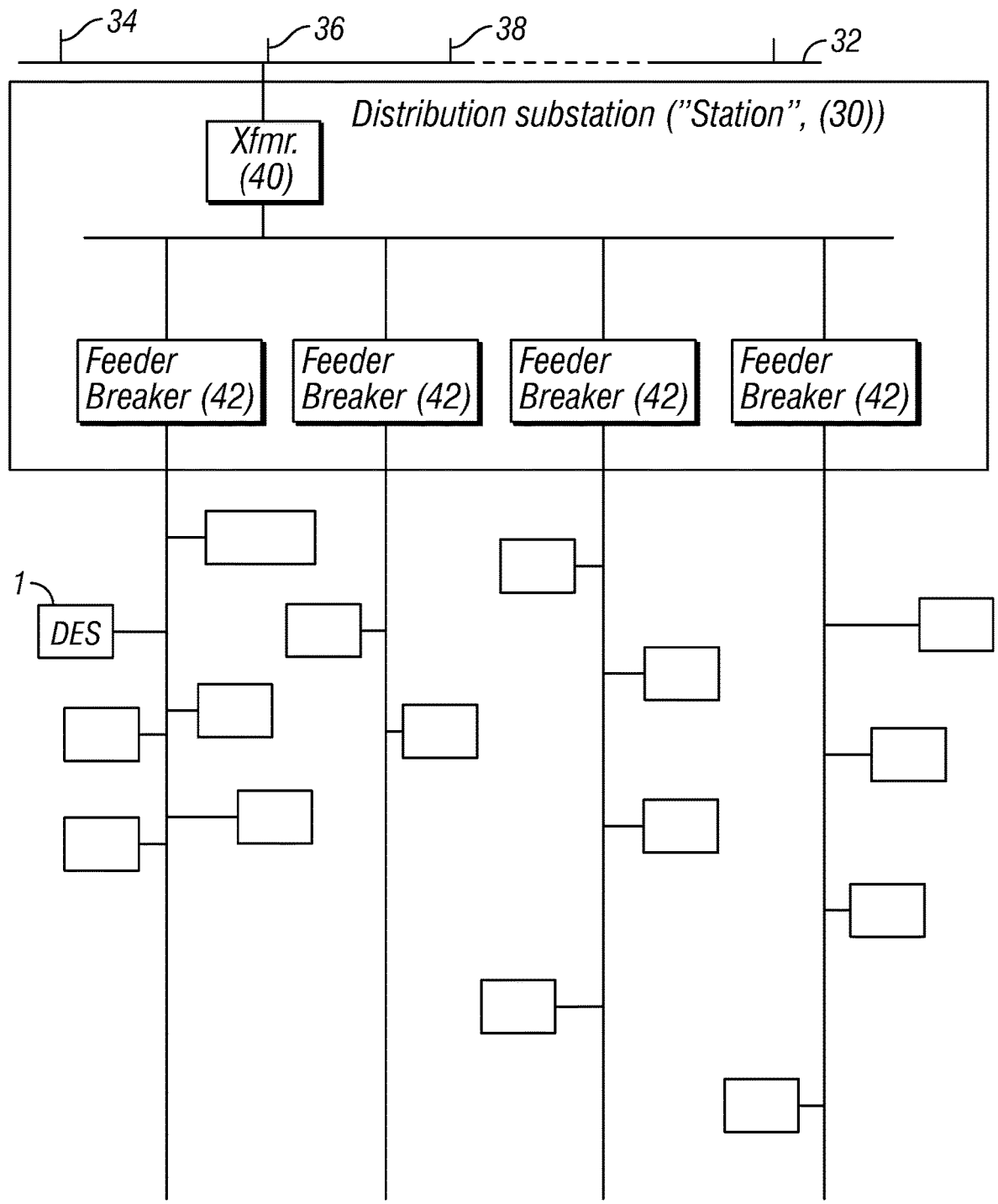
FIG. 1b illustrates a power distribution grid incorporating a DES system managing multiple energy sources including at least one photo-voltaic source.
Figure 2:
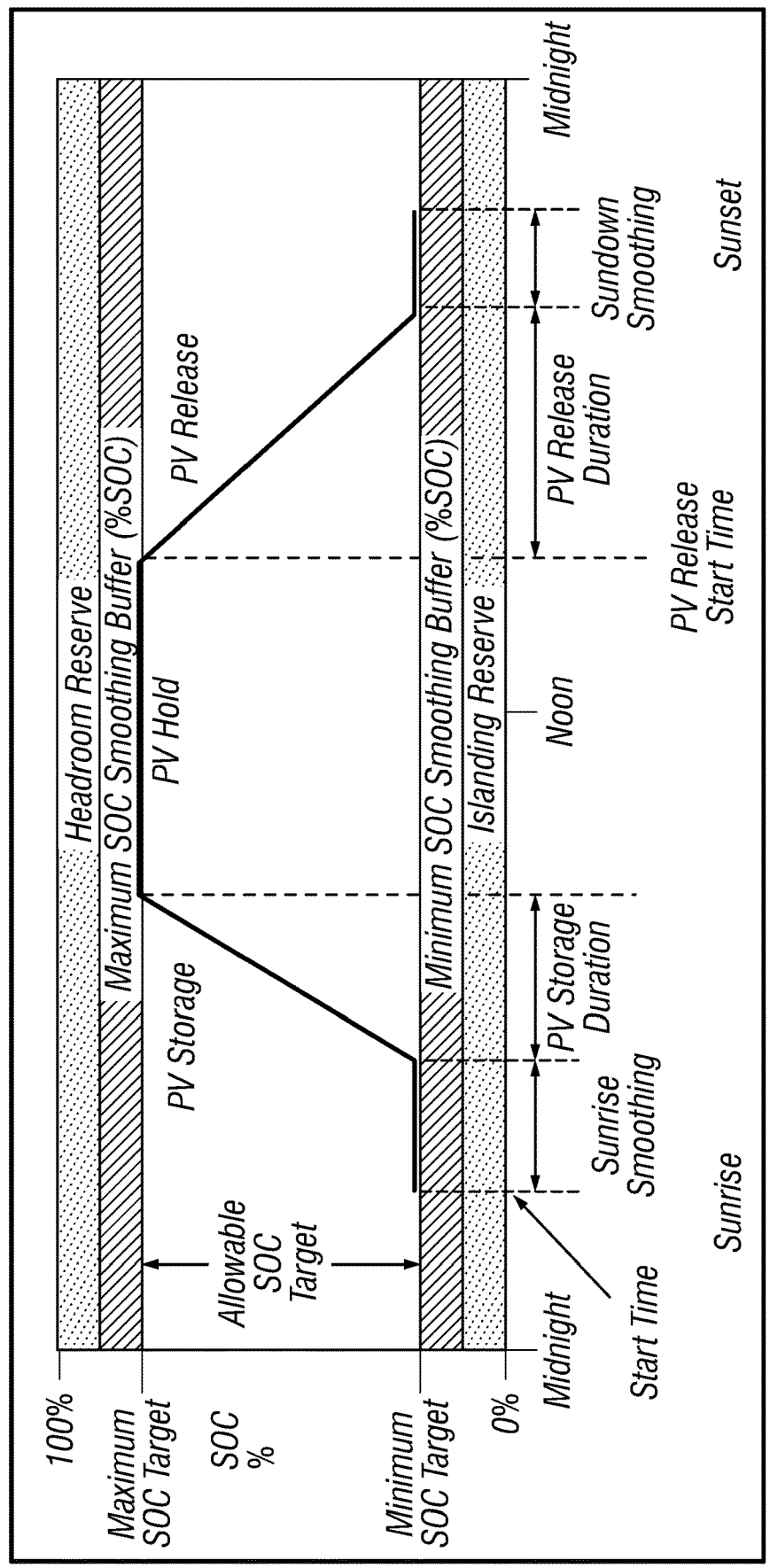
FIG. 2 is a graphic depicting a photo-voltaic integration charge/discharge schedule profile in accordance herein described embodiments.
Figure 3:
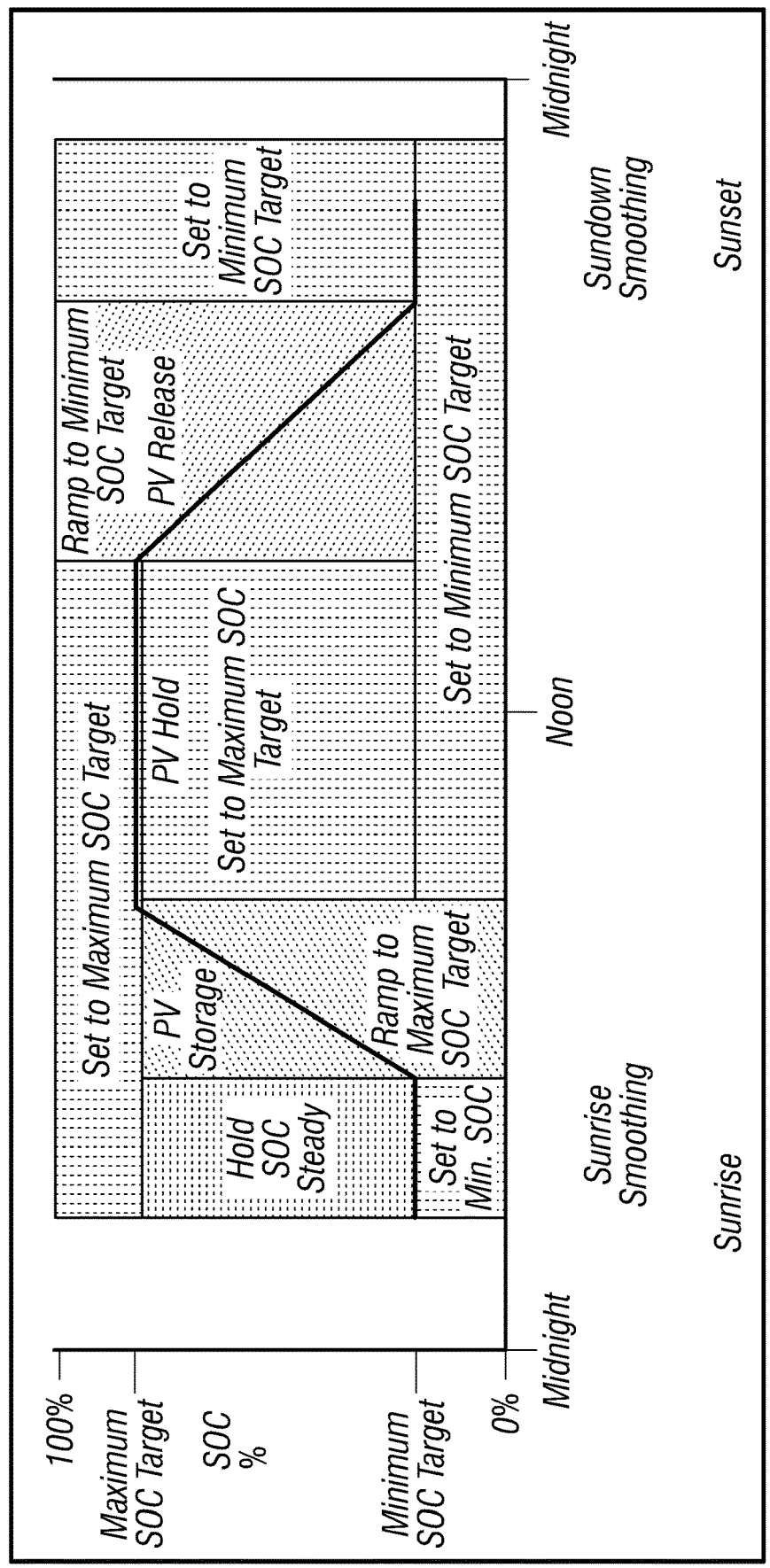
FIG. 3 is a graphic depicting state-of-charge target calculation zones during photo-voltaic integration in accordance with herein described embodiments.
Figure 4:
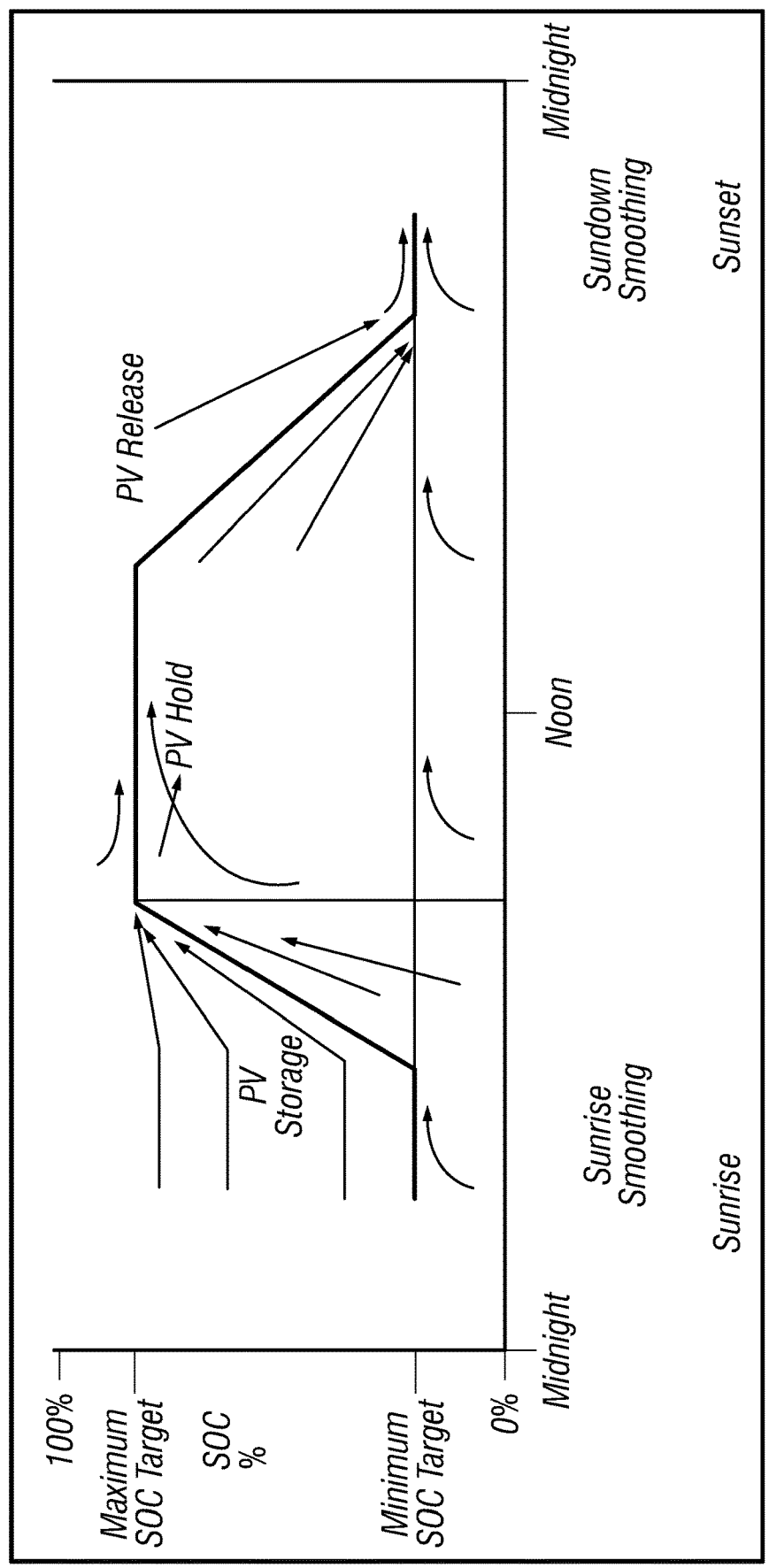
FIG. 4 is a graphic depicting state-of-charge direction of change during DES smoothing plus HUB commanded state-of-charge target off-course corrections in accordance with herein described embodiments.

FIG. 1b provides a rough sketch of a distribution system with DES units 1. Power to the distribution substation, or "station" 30, is fed via a transmission feeder 32 by a variety of generation sources including spinning generation 34, wind generation 36, PV generation 38 and others that enter the station 30 and coupled into the station transformer 40. At the entry to the transformer 40, current and voltage sensing elements (not depicted) provide inputs to a relay providing protection for the transformer as well as power flow metering elements used by the HUB 2 dispatch logic. This described embodiment illustrates a single transformer supplying all of the feeder circuit breakers 42 for simplicity, although alternatively it is possible to have multiple transformers supplying the feeders. The transformer 40 typically feeds multiple feeder circuits, each with its own circuit breaker 42. The number of feeders is arbitrary. It should be noted that the individual circuits are shown each as a single line, although power is actually supplied as three separate phases. Sensing is provided individually on each phase. DES units 1, one identified for simplicity, are scattered throughout the distribution system, outside the station. Although not shown on the diagram, each DES unit 1 is connected to a single phase of the feeder, on a secondary circuit, isolated from the feeder by a distribution customer transformer not shown. The DES units 1 are distributed across multiple phases and multiple feeders. A potential implementation will see as many as a hundred or more DES units connected to the various phases on any one feeder. In the illustrated embodiment, the customer transformers may be connected phase-ground, although with minor transformations the system could easily work with phase-phase connected transformers. It should also be noted that a three-phase DES unit 1 could be built, consistent with the principles disclosed herein. Such a unit would typically serve a three-phase load such as a commercial or industrial customer, and would have the added benefit of being capable of improved feeder balancing since power could be shifted back and forth between phases.

DES units 1, combined with the HUB 2 are uniquely suited to both the PV smoothing and PV integration functions for many reasons. These include the DES unit's inherently distributed location in the grid, their storage and high-speed, 4-quadrant real and reactive power control/conditioning capabilities, and their ability to be deployed near the solar generation sources. Deployment of the DES unit fleet can be staged as penetration of PV increases. Another benefit is the ability of the DES units to go into an "islanded" control mode, disconnecting customers from the utility power source and running the loads from the battery system if voltage exceeds allowable extremes. Since the units are between the customer meter and the distribution substation, the utility has the ability to directly control the operation of the units based at least in part on system needs.

With regard to the smoothing function itself, smoothing involves preventing fast (seconds to sub-second), undesirable voltage fluctuations as the solar input varies or vanishes completely. Since the same or similar solar input is being seen by all solar installations at the same or very similar times, such fluctuations become coherent, system-wide problems. Meanwhile, for the purpose of solar integration, the DES unit 1 must allow at least some of the solar power to flow into the battery storage system for use at a preferred time while allowing any excess to be used immediately by the distribution system. The unique challenge for the overall application is to determine, without having a direct input from each of the solar generators, when the solar power is actually being injected into the system. Such knowledge is the basis of solar integration.

Each DES unit 1 may incorporate an algorithm to smooth (condition), and manage the power flowing through the unit and (indirectly) through the distribution system. The algorithm utilizes the HUB 2 to provide external guidance as to the presence of solar power and a system need to store the power in the storage, i.e., battery system. The algorithm utilizes reactive power, which can be provided at a lower cost than stored energy, to preferentially control voltage to within acceptable limits. This voltage control can be used at any time but is very important during times of high solar activity. If reactive power is not enough to maintain voltage within acceptable limits, the algorithm can adjust power flow into or out of the battery system. In the worst-case scenario, the algorithm can prevent damaging voltage drops from being seen by load-side customers by islanding (disconnecting the customers from the power system and serving them from its internal power source).

In this regard, a DES Unit 1 in accordance with herein described embodiments includes control algorithms selected in real time and as needed, i.e., on-the-fly. Among the control algorithms is one or more power smoothing algorithms, which may take the following inputs:

1. Target State of Charge (SOC). Battery stored energy level, expressed in percent SOC, that the power smoothing algorithm should attempt to maintain. During power smoothing, the SOC will tend to drift up or down as the CES Unit 2 responds to varying PV source 18 output. As the SOC drifts away from the target, the local algorithm slowly forces energy into or out of the battery back towards the Target SOC. The further the SOC drifts away from the target, the more aggressive the algorithm becomes at compensating.
2. Emergency Voltage Control (high and low) voltage limits. If the voltage begins to fall outside this specified range, the unit will use reactive power (Volt-ampere reactive, VARs) to maintain voltage within the limits. Additional, local limits are provided such that if voltage wanders even further out of range and cannot be corrected, the DES unit 2 will island to protect its customers.

With the ability to select the algorithm on-the-fly, and to perform power smoothing when required, the HUB 1 can control a hybrid system with differing types or specializing DES units 1. For example, designated ones of the DES units 1 may provide energy and capacity management while designated other DES units 1 may be designated PV Smoothing units. Although, it is understood given operating conditions the units may be called upon to provide additional the alternate functions.

The HUB 2 controls the PV smoothing DES units 1 by dynamically adjusting the Target SOC. This allows the units to perform high-speed smoothing while selectively steering the solar energy into the storage medium, i.e., battery or out of the battery for system needs. One possible implementation of a control algorithm utilizes a pre-defined, trapezoidal-shaped charge-discharge profile.

The DEM/DES/HUB approach described herein facilitates solutions to the many individual system issues that can arise when integrating PV systems into a widely-deployed distributed storage system. These include managing potential conflicts between the desire to store "green" energy and the need to address urgent system capacity constraints.

The part of the algorithm that runs in the DES unit 1 operates something like a harmonic filter, guiding the PV-rich power into the battery storage, while damping sudden changes in PV power injection, reducing their effect on customer voltage. In the process, the battery is used something like a capacitor. If reactive power is not enough to smooth the voltage, power storage into the battery is reduced. Those familiar with harmonic filter models applied to such problems will realize that the average resulting (smoothed) power will tend to drift up or down with changes in system load. An algorithm that simply smoothes the load will tend to cause the batteries to slowly discharge if the load is rising, and slowly charge if the load is dropping. Thus, an additional feature of the algorithm in the DES Unit 1 is that the further the battery state of charge (SOC) is away from the desired value, the more power is allowed to flow into or out of the battery, subject to suitable limits of various forms.

The part of the PV integration algorithm that runs in the HUB, among other things, meets two goals. A first goal is to guide the solar energy into the battery when sunlight is present, and to discharge that energy at the most appropriate time for the system. With regard to discharge logic, the algorithm can be used to serve many diverse and potentially conflicting needs. Its primary benefit could be to reduce carbon footprint, to reduce a generation or transmission system shortfall, to help control a wide variety of distribution system capacity shortfalls, or to serve a combination of all of these requirements.

Additional control inputs may include weather forecast data and direct inputs from solar intensity monitoring sensors. The weather forecast data could be used to enable or disable ramped storage (time shifting) of the PV output, while leaving the smoothing function intact to handle uncertainty. It could also be used to influence ramping, allowing it to start or end earlier or later. Weather observation data from bellweather locations such as nearby airports could also enable or disable the ramping in near real-time.

Solar intensity monitoring sensors could also be used to enable or disable the ramping similar to the use of weather observation data but with higher accuracy. Solar intensity data could also be used to adjust the ramping slope proportionate to solar intensity. All of the above methods may be facilitated by a trapezoidal charge-wait-discharge energy profile with the flexibility to handle the constantly-fluctuating PV output, as described below.

Exemplary Implementation

In an exemplary implementation, three general mechanisms, with varying levels of sophistication, are provided to manage the flow of PV energy into and out of the storage system:

Scheduled PV Energy Time Shifting. This mechanism relies primarily on a fixed schedule related to the theoretical presence of solar energy and the expected hourly load profile Irradiance Driven PV Energy Time Shifting; Real-Time, hour & day forecast input (data source TBD). This mechanism improves the scheduled PV Energy Time Shifting algorithm by utilizing outside knowledge such as weather forecasting information.

Irradiance Driven PV Energy Time Shifting with local measurement (sensor input TBD). This method improves the scheduled PV Energy Time Shifting algorithm by utilizing various sensing methods to locally measure incoming solar energy.

These mechanisms are managed by the HUB 2 utilizing the DES unit's 1 renewable smoothing algorithm. All of these methods are integrated with the HUB's 2 other energy and capacity management functions to optimize overall system performance. This optimization includes the flexibility to designate certain DES units 1 as located or collocated with PV distributed resources and to designate other DES units 1 as serving only energy or capacity management functions. This allows the DES unit's 1 smoothing function to be utilized where PV-related power smoothing is required, while allowing more effective use of the storage and inverter where PV smoothing is not required. When combined with the PVI enhancements, the DEM's energy dispatch features, in summary, consist of the following:

System Fleet (Substation-level) functions to support the Utility's energy management system (EMS) and explicitly to address external EMS requirements Substation-level request for capacitive, reactive power output (explicitly exclusive of PVI units) with optimized power factor at the feeder level Substation-level request for real power demand restriction (peak shaving) respecting distribution capacity constraints and preferentially utilizing both PVI stored energy and PVI-available demand.

Substation-level (enable/disable) control over the use of PVI-configured Units to smooth power and store solar energy when available and to discharge that energy at preferred times (load-shifting).

Substation feeder and transformer-level functions to support:

Reactive power compensation to achieve unity power factor at each feeder breaker, coordinated with EMS requirements and excluding PVI-configured Units.

Real power capacity mitigation at the feeder and transformer breakers coordinated with PVI-configured units.

Group (Sub-feeder)-level control over coordination of DES units 1 to support all of the features above:

Where the discharge schedules may be either:

Fixed discharge schedule without regard to explicit capacity or energy management constraints.

Demand-limited discharge schedule with prioritized control over peak shaving for EMS and capacity constraints.

Where the charge schedules may be either:

Fixed charge schedule without regard to explicit capacity or energy management constraints.

Demand-limited charge schedule with prioritized control over peak shaving for EMS and capacity constraints.

and where PVI schedules may be calling for coincident PV smoothing, storage of PV energy or discharge of stored PV energy.

Operating Modes, Commands and Rules

1) All variations of the PV integration (PVI) algorithms can be treated somewhat similarly to the existing scheduled fixed charge or discharge algorithms:

a. Grouped Scheduling. The algorithm is applied to CES Units based on their membership in a Group that has the PVI algorithm specified for use. In the initial implementation of the DEM, the definitions of all Groups had provisions for referencing a wide variety of schedules, allowing one schedule to be selected for group charging and a separate schedule to be selected for group discharge. With the addition of PVI, each Group will have provisions for a third schedule for PVI.

b. PVI Schedules are Overlapping and Dynamic. Without PVI, it can easily be determined if schedule conflicts exist because all times are invariant to unpredictable events. With PVI, both the times of solar availability from the lunar point of view, and the availability of solar energy from the atmospheric point of view, will vary from day to day. Therefore PVI schedules are allowed to coexist (overlap) with all other schedules. The overlap between the schedules is important, since it provides backup schedules for utilization of the distributed storage and inverters when PVI is not required or the sun is not out. For the present version of software, Dashboard-level operator overrides allow the PVI operation to be enabled or disabled based upon observed solar availability. In future versions, solar availability may be determined automatically.

c. Active PVI Schedules. A PVI schedule is considered to be active from the effective starting time (either fixed start time or lunar-calculated sunrise) in its schedule to the end of its schedule, assuming:
      i. A PVI schedule is specified for the Group
      ii. PVI is enabled for the Group
      iii. PVI is enabled for the system as a whole.

d. Priority of Active PVI Schedules. When a PVI schedule is active, it overrides the direct effect of both discharge and charge schedules on all CES Units in the Group. The other schedules may have an influence over the energy flow into the Unit but the Unit will always be performing its PV smoothing function governed by the DEM's PV smoothing target SOC and commanded voltage bounds.

e. CES Unit Power Smoothing Mode. If a CES Unit is in a Group with an Active PVI Schedule, the Unit will be commanded to perform voltage-limited PV smoothing with an SOC target. That is, instead of being sent commands explicitly setting target real and reactive power output levels, on every control loop iteration the Unit will be sent upper and lower voltage limits (setpoint along with +/− % differentials) and an SOC Target in percent.

f. PVI Schedule Inactive. Any time that the PVI schedule is inactive, the Group's operation will be governed by behavior of the other charge/discharge schedules and algorithms.

g. Group/Fleet Availability. Consistent with the PVI operation described above, the PVI schedule's applicability will be controlled by two, separate enables and disables, both of which are dashboard-resident State variables. One enable will be part of the Group configuration, and one will be associated with the fleet (CES DEM Dashboard). If PVI is disabled, the Fleet/Group will participate in capacity energy dispatch as before. For a Group's PVI schedule to be active, both the Group enable and the system enable must be true (in the "Enabled" state).

h. CES Unit Availability. Each CES Unit may be disabled via remote request, local request, or by using a physical selector switch (Disconnect control mode). If a CES Unit is in a PVI Group with an active schedule, but is disabled, it will not respond to the PVI commands. It is therefore not necessary to specifically enable/disable PVI participation at a CES Unit level.

Validation of Algorithm Selection between Groups. In general, it would not make economic sense to have one group of CES units charging while another group is discharging. However, due to unusual constraints, such as one feeder overcapacity and another feeder undercapacity, with both connected to active PV sources, such a circumstance might occur. The following rules dictate how these potential conflicts are managed in the absence of capacity threshold violations:
      i. Scheduled Fixed Charge/Discharge. These groups will generally be used to handle unusual circumstances in coordination with other groups set up for demand-limited charge/discharge. The conflict should be allowed on the assumption that the user "knows best" as to how to set up the system.

ii. Demand-Limited Charge/Discharge. From the standpoint of validation of the configuration, potential conflicts cannot be determined at configuration time, and are therefore allowed. Other types of conflict resolution that must be performed in real-time are discussed below in the section on Coexistence of PVI with Other Capacity Management Functions.
i. Fixed Time PVI Parameters. For the initial version of the PVI algorithm, all scheduled times and SOC targets are predetermined (configured) in static, absolute terms. The times are in time of day or duration, both expressed in HH:MM with the same scheduling consideration and features for Day of Week and Holiday as is provided for existing energy dispatch scheduling. SOC Buffers are in %. The algorithm determines Maximum and Minimum SOC Targets from the configured buffers and other settings such as Islanding Reserve and Headroom Reserve. In the future it is possible that the configured times might be adjusted through various automated means.
j. PVI Fixed Time Charge/Discharge Profile. For all PVI algorithm variants, a trapezoidal charge/discharge energy dispatch profile is specified. However, in contrast to scheduled fixed charge or discharge algorithms, the profile drives energy flow (into or out of the battery) by guiding the battery state of charge (SOC) up or down. The fully-configured profile is shown graphically in FIG. 1 below:
k. For PVI schedules, the parameters that configure the PVI algorithm apply to the Group as a whole, and cannot be assigned on a Unit by Unit basis. The PVI Schedule parameters are defined as follows:
  i. Start Time. Time of day when the PVI algorithm should be activated. This time will tend to be the approximate time of sunrise.
  ii. Sunrise Smoothing Duration. The length of time during which the PVI algorithm should be allowed to run without changing the SOC target. Specified as a time duration in minutes.
  iii. PV Storage Duration. This is the length of time from the start of the scheduled period that SOC should be adjusted (or ramped-up) to store the available PV energy, with the goal being to reach the SOC target value for the group at the end of the ramp up period.
  iv. PV Hold Duration. Elapsed time during which the SOC target should be held at its maximum value without change. This time duration allows the PV energy to be held while continuing to perform PV smoothing while waiting for a preferred time to begin discharge.
  v. PV Release Start Time. The time of day when the PVI algorithm will begin discharging the battery to release stored PV Energy.
  vi. PV Release Duration. This is the length of time during which the SOC should be reduced to reach the SOC minimum PV integration value at the end of the time period. In future versions, this time could be defined in different ways. For example, it might be adjusted based upon solar incidence. Or it might be fixed to a time of day associated with the end of peak loading.
  vii. Sundown Smoothing Duration. This is the length of time during which the SOC should be held at its minimum target value to allow for smoothing near the time of sundown.
  viii. Minimum SOC Smoothing Buffer. This is the amount of energy, in % SOC, that should be left in the battery to provide adequate reserve for the PV smoothing algorithm both before the sun comes out and near sundown, typically after discharge (PV energy release) completion.
  ix. Maximum SOC Smoothing Buffer. This is the amount of energy, in % SOC, that should be left out of the battery to provide adequate reserve for the PV smoothing algorithm as the battery approaches maximum PV energy storage.
l. CES Unit Control. From the time when the algorithm begins running (Start Time), until the end of the run (after the Sundown Smoothing Duration has expired), the CES Unit will be continuously commanded by the DEM to operate in Power Smoothing mode.
  CES Unit Energy allocation is managed by the DEM with cooperative participation by individual CES Units. Islanding Reserve, Depleted Battery Reserve, and Headroom Reserve are CES Unit settings since the CES Unit has some autonomous functions which utilize those settings. Minimum and Maximum SOC Smoothing Buffer are not required as CES Unit settings, however, since they are implicit in the Target SOC communicated from the DEM to the CES Unit.
  (informative note) In the case of the fixed charge and discharge schedules used for the other capacity management operating modes, the ramping simply allows demand to transition smoothly up and down. In the case of PV integration, the ramping is not of demand but of battery SOC, and the ramping is fundamentally what drives energy into or out of the storage system. Holding of SOC at a given value simply defines a period of time when the SOC target should be held at that level for an extended period of time, allowing PV smoothing but preventing significant storage or release of solar energy.
m. Effective SOC Target calculation. For many reasons, at every evaluation interval, the present SOC of each battery could be at any level from 0% to 100% of maximum. For example, a unit could have just been put online after being disabled. Or, the unit could have just returned from an islanded circumstance, or the system may have just been reconfigured, etc. The logic must always drive the SOC toward the desired value following the trapezoidal shape. Guiding criteria are that we want to charge the batteries from solar energy and not from the grid and we want to always try and provide for an adequate SOC to allow the smoothing to function to work whenever it's enabled. The following calculations handle these requirements consistently. See "Error! Reference source not found." for a graphic description of how the SOC Target is calculated based upon the present SOC at the time of evaluation, and "Error! Reference source not found." for a graphic description of how the SOC in the battery is driven by the logic below during off-course corrections:
  i. Present SOC above Maximum SOC Target prior to PV Release. The SOC Target should be set to the Maximum SOC Target.
  ii. Present SOC below Minimum SOC Target prior to PV Storage. The SOC Target should be set to the Minimum SOC Target. If neither this condition nor the previous condition is true, the other calculations below should be performed.
  iii. Residual Storage During Sunup Smoothing. Residual energy stored in the CES Unit should be held rather than released prior to the PV Storage time interval. To accomplish this, the SOC Target should be held fixed during this time interval to reduce the possibility of having energy drifting into the storage system over an extended period of time due to smoothing. On startup after the first reading of the SOC from each Unit, the target SOC should be established for Sunup Smoothing as either the Minimum SOC Target or the present SOC whichever is greater. That target should then be held fixed throughout the sunup smoothing time period. Note: The PVI algorithm remains inactive and uninitialized for any CES Unit until the Unit responds to a DNP poll with valid data. After that point, if a communication error prevents updating of the Unit's status or data, the previous data read is used.

iv. Target SOC during Sundown Smoothing. During this entire time period, the Target SOC should remain fixed at the Minimum SOC Target value.

v. Target SOC during PV Hold. During this entire time period, the Target SOC should remain fixed at the Maximum SOC Target value unless the Present SOC is below the Minimum SOC Target. If the Present SOC is below the Minimum SOC Target, then the Target SOC should remain fixed at the Minimum SOC Target until the end of Sundown Smoothing. Note that if the Present SOC is ever found to be below the Minimum SOC Target after PV Storage is completed, it suggests that solar energy input is not sufficient to provide significant energy storage. In this case the goal is to store just enough energy in the battery to support solar smoothing rather than time-shifting.

vi. Target SOC during PV Storage. If the PVI algorithm is in PV Storage mode, the Target SOC is calculated assuming a linear SOC ramp to reach the Maximum SOC Target by the end of the PV Storage interval. The calculation is:

Target SOC=Present SOC+(Maximum SOC Target−Present SOC)/(Elapsed Time to Reach Maximum SOC Target/Evaluation Interval Time).

1. For the calculations above, if the Present SOC is greater than the Maximum SOC Target, the Target SOC is set to the Maximum SOC Target, otherwise
2. For the calculations above, if the Present SOC is less than the Minimum SOC Target, then substitute the Minimum SOC Target for the Present SOC, otherwise
3. If the Present SOC is less than the previous SOC read from the CES Unit during PVI, the value used for the present SOC is the previous SOC read from the CES Unit. Note: The purpose of the last constraint above is to insure that the SOC target always moves in a positive direction toward the storage target.

vii. Target SOC during PV Release. If the PVI algorithm is in PV Release mode, the Target SOC is calculated assuming a linear discharge to reach the Minimum SOC Target by the end of the PV Discharge interval. The calculation is:

Target SOC=Present SOC−(Present SOC−Minimum SOC Target)/(Elapsed Time to Reach Minimum SOC Target/Evaluation Interval Time).

1. For the calculations above, if the Present SOC is less than the Minimum SOC Target, the Target SOC is set to the Minimum SOC Target.
2. If the Present SOC is greater than the previous SOC read from the CES Unit during PVI, the value used for the present SOC is the previous SOC read from the CES Unit. Note: The purpose of the last constraint above is to insure that the SOC target always moves in a negative direction toward the discharge target.

n. Flexible use of this trapezoidal profile is supported, allowing one or more of the solar integration time intervals to be set to zero. This would permit, for example, Scheduled Fixed Discharge to be used in lieu of PV release, if the PV Storage time interval was non-zero, but the PV Release time interval was zero. However, some combinations are invalid because they would trigger sudden, large energy swings. Allowable combinations of durations are shown in the table below:

| Sunrise Smoothing | PV Storage | PV Hold | PV Release | Sundown Smoothing |
|---|---|---|---|---|
| Zero | Non-zero | Zero | Zero | Zero |
| Zero | Non-zero | Zero | Non-zero | Zero |
| Zero | Non-zero | Zero | Non-zero | Non-zero |
| Zero | Non-zero | Non-zero | Zero | Zero |
| Zero | Non-zero | Non-zero | Non-zero | Zero |
| Zero | Non-zero | Non-zero | Non-zero | Non-zero |
| Non-zero | Non-zero | Zero | Zero | Zero |
| Non-zero | Non-zero | Zero | Non-zero | Zero |
| Non-zero | Non-zero | Zero | Non-zero | Non-zero |
| Non-zero | Non-zero | Non-zero | Zero | Zero |
| Non-zero | Non-zero | Non-zero | Non-zero | Zero |
| Non-zero | Non-zero | Non-zero | Non-zero | Non-zero |

Coexistence of PVI with Other Capacity Management Functions

Peak-shaving versus PVI energy management functions tend to be inherently different. Peak shaving functions address various feeder, substation and energy management capacity and generation limitations inherent in the distribution system. PVI functions address PV-related, localized voltage and power quality requirements, further allowing the solar energy to be stored and used later to reduce peak generation requirements or carbon footprint (load-shifting). However, both peak shaving and PVI-designated CES Units can be effectively utilized in combination. For example, in a heavily-urbanized area there might be significant substation capacity constraints while at the same time there might also be certain selected residential areas with significant PV penetration. To address the needs of these hybrid systems, the DEM must coordinate the simultaneous operation of CES Units running both types of algorithms.

Proper coordination of the two types of energy management functions involves conflict resolution between charge and discharge requirements that might be occurring simultaneously. Simultaneous charging and discharging of units affecting the same part of the distribution system is considered a conflict due to the combined energy loss of the energy transfers into/out of the battery system, plus the unnecessary effect on the cycle life (maximum number of charge/discharge cycles) of the battery.

For example, it is considered a conflict of fleet operations if a CES Group on a feeder, configured for peak shaving is requesting discharge while another Group configured for PVI is in PV Storage mode, charging its battery. It is anticipated that the CES Fleet operator will carefully schedule fleet operations to minimize conflicts between peak shaving and PV Integration of storage resources handled by a single DEM. It is possible that conflicts will occur, however, so a simplistic approach to dealing with potential conflicts is desired. Further, even if peak shaving is not scheduled to be active, an associated limit (substation, transformer or feeder overcapacity) could be exceeded for some unexpected reason. If some CES Units configured for PVI are requesting charging, it would be highly undesirable to unnecessarily burden the distribution system with the additional load. Instead, the units should not charge from PV and all of the PV power should be available to the system. Ideally, under such conditions, stored energy in the PVI units should be discharged to reduce the system-level overload, but this can be very complex to fully-achieve. Proper coordination of the two types of energy management functions also involves coordination to insure that the PV smoothing algorithm in PVI-designated CES units is always enabled and active, as scheduled, during hours of daylight, even if a capacity constraint is calling for discharge.

In summary, there are some fundamental principles that can be applied to these hybrid peak shaving/PVI systems:
- PVI-designated units must always have their smoothing functions, with associated energy storage buffers, enabled and operating during hours when PVI is scheduled. This scheduling will inherently take into account the fact that the sun rises in the morning and sets in the evening. Correspondingly, PV smoothing is not required at night when there is no sunlight.
- It does not make sense, from the economic point of view, for any of the capacity management algorithms to be calling for units on a feeder to be discharging, while at the same time, other units on that same feeder and phase are in PV Storage mode, increasing effective demand on the feeder. Similar conflicts could occur with substation transformer overcapacity, or an external request for demand reduction. In essence, an algorithmic conflict is one that leaves some units charging while other units are discharging, when the conflict can be prevented by reducing the absolute magnitude of the demand comparably on both units or groups.

Peak Shaving—PVI Coordination Algorithm

The following algorithm provides a simplified way to coordinate the peak shaving and PVI algorithms to prevent charge/discharge potential conflicts.

1) A CES Unit is designated to be in PVI mode if
   a. It is in Manual Override/PVI Mode, or
   b. It is in Automatic mode, and the System PVI and Group PVI Mode is enabled, and its Group's PVI schedule is active (based on day of week and time versus scheduled times and durations).
2) A CES Unit in PVI mode will always be commanded to do PV Smoothing without regard to any possible conflicting system requirements for peak shaving-related storage or discharge. Thus, further definition of commands sent to the unit in PVI mode relate to commanding the Unit's Target SOC which may be influenced by peak shaving system requirements.
3) A PV Coordination Storage Event (PV storage conflict) is present for a given CES Group in PVI mode under the following circumstances:
   a. The Group is active (it has CES Units assigned). Note that a unit can be manually overridden and commanded in or out of PVI mode. Individual Unit status should not influence the Group status.
   b. The PVI schedule time is within the PV Storage or PV Hold Time Intervals, and
      i. A non-zero External Three-phase Demand Limit is present, and
         1. At least one CES Unit in the fleet, operating in Peak Shaving mode, was being commanded to discharge to meet the limit on the last control cycle, or
         2. The DEM's total load under its control (presently, the load at the substation transformer) is above or equal to the External Three-Phase Demand Limit.
      ii. Or a non-zero Transformer three-phase demand limit is present and,
         1. At least one CES Unit in the fleet on the given phase was being commanded to discharge to meet the limit on the last control cycle, or
         2. The load at the substation transformer on the given phase is above or equal to one third of the Transformer Three-Phase Demand Limit.
      iii. Or a non-zero Feeder three-phase demand limit is present and,
         1. At least one CES Unit in the fleet on the feeder, on the given phase was being commanded to discharge to meet the limit on the last control cycle, or
         2. The load at the feeder breaker on the given phase is above or equal to one third of the Feeder Three-Phase Demand Limit.
4) If a PV Coordination Storage Event is active, all units in the affected Group operate in PV Release operating mode, with the target SOC calculated for a discharge that ends at either the end of the PV Release time interval, if scheduled, or otherwise at the end of PV Hold. The Target SOC is calculated assuming a linear SOC Target ramp to reach the Minimum SOC Target by the 24 end of the interval. The calculation is:

Target SOC=Present SOC−(Present SOC−Minimum Target SOC)/(Elapsed Time to Reach Minimum SOC Target/Evaluation Interval Time).

Note: If the Present SOC is less than the Minimum SOC Target, it is set to the Minimum SOC Target.

The invention claimed is:

1. A method of integrating a plurality of renewable energy sources, the renewable energy source characterized by varying or unpredictable output with time, the method comprising:
   providing a plurality of distributed energy storage units and coupling each of the distributed energy storage units to one or more of the renewable energy sources;
   providing a self-contained controller and communicatively coupling the controller to each of the plurality of distributed energy storage units and to each of the renewable energy sources;
   directing from the controller one or more of the distributed energy storage units to one of store energy from a coupled renewable energy source and dispatch energy from its storage to a distribution feeder;
   smoothing output fluctuations of one or more of the plurality of renewable energy sources by: selectively providing reactive power, storing energy into, or dispatching energy from the distributed energy storage units under direction of the controller, and
   dynamically adjusting with the controller a target state of charge of the distributed energy storage units directed to smoothing the output fluctuations.

2. The method of claim 1, wherein coupling each of the distributed energy storage units to one or more of the renewable energy sources comprising coupling the distributed energy storage units via a distribution substation.

3. The method of claim 2, wherein coupling the controller to each of the renewable energy sources comprises coupling the controller to power flow metering disposed within the distribution substation.

4. The method of claim 1, wherein smoothing comprises preferentially utilizing reactive power to control voltage.

5. The method of claim 1, comprising managing energy and capacity of a distribution feeder via a first subset of the distributed energy storage units and smoothing output fluctuations of one or more of the plurality of renewable energy sources by selectively providing reactive power, storing energy into or dispatching energy from a second subset of the distributed energy storage units.

6. The method of claim 1, wherein smoothing comprises dynamically adjusting a state of charge of a subset of the plurality of distributed energy storage units.

7. The method of claim 1, comprising receiving at the controller at least one of weather forecast data and solar intensity data.

8. The method of claim 7, comprising selectively enabling or disabling energy storage to or discharge from the distributed energy storage units based upon at least one of the weather forecast data and solar intensity data.

9. The method of claim 8, wherein selectively enabling or disabling energy storage to or discharge from the distributed energy storage units based upon at least one of the weather forecast data and solar intensity data is in accordance with one or more ramp functions.

10. The method of claim 8, wherein selectively enabling or disabling energy storage to or discharge from the distributed energy storage units based upon at least one of the weather forecast data and solar intensity data comprises at least one of schedule photo-voltaic (PV) energy time shifting; irradiance driven PV energy time shifting based upon real-time, hour and day forecast data; and irradiance driven PV energy time shifting with local measurement.

11. The method of claim 1, comprising associating the plurality of distributed energy storage units into groups, and wherein directing from the controller one or more of the distributed energy storage units to one of store energy from a coupled renewable energy source and dispatch energy from its storage to a distribution feeder comprises directing from the controller one or more of the groups of distributed energy storage units to one of store energy from a coupled renewable energy source and dispatch energy from its storage to a distribution feeder.

12. The method of claim 1, wherein smoothing output fluctuations of one or more of the plurality of renewable energy sources by selectively providing reactive power, storing energy into or dispatching energy from the distributed energy storage units under direction of the controller comprises selectively providing reactive power, storing energy into or dispatching energy from the distributed energy storage units in accordance with a state-of-charge of the distributed energy storage unit.

13. The method of claim 1, smoothing output fluctuations of one or more of the plurality of renewable energy sources by selectively providing reactive power, storing energy into or dispatching energy from the distributed energy storage units under direction of the controller comprises selectively providing reactive power, storing energy into or dispatching energy from the distributed energy storage units in accordance with a trapezoidal charge/discharge energy dispatch profile.

* * * * *